March 1, 1932.  E. L. GROC  1,847,829
COLOR PHOTOGRAPHY AND COLOR CINEMATOGRAPHY
Filed Sept. 21, 1928
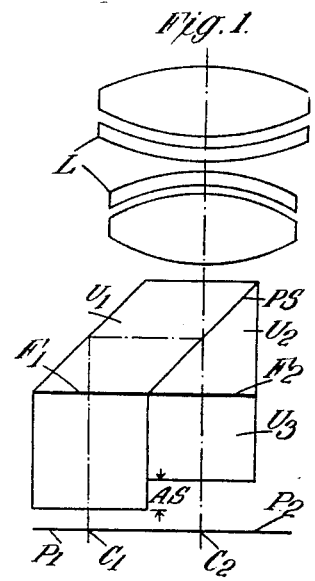
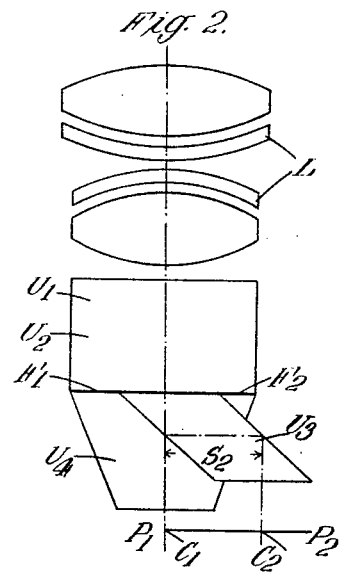
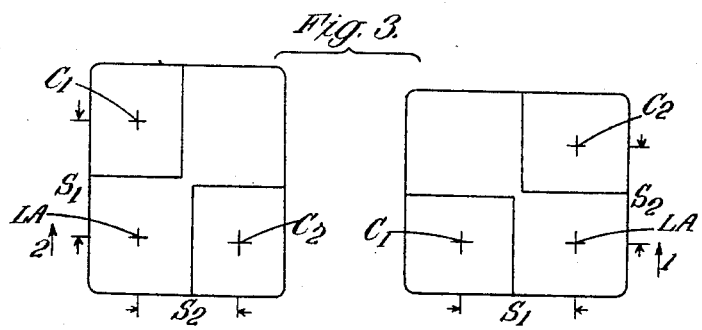
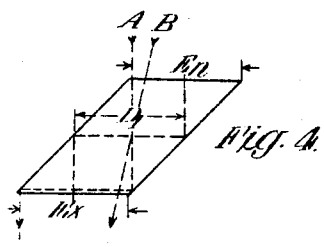
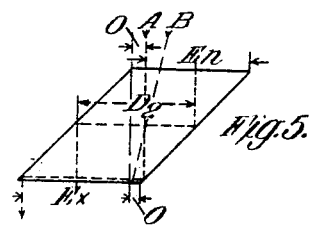
INVENTOR
E. L. GROC Patented Mar. 1, 1932

1,847,829

UNITED STATES PATENT OFFICE

EDOUARD LUCIEN GROC, OF LONDON, ENGLAND, ASSIGNOR, BY MESNE ASSIGNMENTS, TO RAYCOL BRITISH CORPORATION LIMITED, OF LONDON, ENGLAND, A CORPORATION OF GREAT BRITAIN

COLOR PHOTOGRAPHY AND COLOR CINEMATOGRAPHY

Application filed September 21, 1928, Serial No. 307,433, and in Great Britain February 20, 1928.

This invention relates to improvements in color photography and color cinematography, and has for its chief object to provide an improved arrangement of the pictures on the film or the like so that color cinematography may be obtained without resort to the phenomenon known as "persistence of vision" to give the color effect and also without the use of any special projector mechanism, as with my invention the film is run at the ordinary speed so that no extra strain is placed on the projector mechanism.

According to this invention I arrange two or more pictures of the same object or group of objects within the space which is normally occupied by a single picture in the present monochromatic cinematography. The two or more pictures are taken through suitable color filters so that when the pictures are combined by means of a suitable optical device a projected picture is obtained in substantially natural colors.

I will hereinafter refer to the space normally occupied by a single picture in the present monochromatic cinematography as a "single monochromatic space".

My invention also relates to an arrangement of prisms used in conjunction with one photographic lens to produce the two or more pictures of the same object, or group of objects, using suitably colored light filters within a single monochromatic space. Such pictures, being taken with one lens will be free from any parallax errors. The pictures are taken simultaneously on the same sensitized surface, and as close to each other as possible without overlapping.

In order to secure the desired result, using one lens only, it is essential that the optical lengths of the light paths from the plane of each of the pictures to the lens should be absolutely the same.

When the distance from the centre of each of the pictures to the optical axis of the lens is the same I use a rhomboidal prism, with its acute angles approximately 45 degrees, between the lens and the sensitized surface. The first reflecting face of this prism (hereinafter called unit 1) is either "half silvered", silvered in strips, or in any desired pattern. On to this reflecting surface a second unit (a prism with an angle between its two polished faces, the third being grey, equal to the acute angle of the rhomboidal prism) is cemented to allow the light, from the lens, to pass through the unsilvered portion of the first reflecting surface. The uncemented face of the second unit must be in the same plane as the adjacent face of the obtuse angle of the first unit.

A third unit, a rhomboidal prism identical to the first unit is cemented or placed on to the emergent side of the second unit. This third unit (rhomboidal prism) lies at right angles to the first rhomboidal prism, so that the light which passes through the partially silvered surface of the first unit is deflected at right angles to the reflected light. This allows of a maximum size being obtained for the pictures.

A fourth unit, a parallel sided plate of glass, is cemented or placed on to the emergent face of the first rhomboidal prism, of the same thickness as the total glass path traversed by the light which goes direct through the partially silvered surface less the glass path through the third unit (rhomboidal prism).

Since the reflection is equal for both pictures it follows that if the material of the three prisms and the glass plate have all the same refractive index, then the optical paths will all be equal, and the pictures will lie in the same plane.

However, since the standard size film in common use at the present time is rectangular, it becomes necessary to make the smaller pictures, which have to lie inside the area of the standard gate, also rectangular in order that the pictures projected from them may conveniently fit the screen. This fact entails making the distances from the centres of the pictures to the optical axis of the lens unequal.

I therefore make one of the rhomboidal prisms, corresponding to the shortest separation between the centre of the picture and the lens axis, of a glass whose refractive index is lower than that of which the remaining three units, constituting the prism block, are made.

Then the two images can be made to lie in the same plane:—

1. By adjusting the air space between the emergent faces of units Nos. 3 and 4, and the thickness of unit 4.

2. By varying the refractive index and the thickness of unit 4, when the emergent faces of units 3 and 4 are in one plane.

3. By varying the refractive index and the thickness of unit 4 in conjunction with the air space between units 3 and 4 emergent faces. For example, if the rhomboidal prism gives the greater deflection, then it and its parallel plate (called the 4th unit above) are made of the same baryta flint to avoid refraction at the partially silvered surface. The third unit (rhomboidal prism giving the lesser deflection) can be made of a crown glass of such refractive index that by varying the thickness of the 4th unit (parallel plate) the two images lie in the same plane. The colored light filters can be placed between the prisms and the sensitized film, and we can then take advantage of these filters to finally correct, if necessary, any difference in the plane of the pictures due to errors of calculation or manufacture of the prisms or glass plate. This we effect by varying the thickness of the filters or their cover glasses by such an amount as to cause the pictures to lie in the same plane.

In the rhomboidal prisms I make the deflection produced by them greater than the width of the used entrance and emergence faces measured in the direction of the deflection: since if the entrance and exit faces, measured in the direction of the deflection, equal the deflection, then parallel beams of light entering the prism perpendicular to the entrance face are twice reflected, but some of the rays of light entering the prism which make a smaller angle with the first reflecting surface than the before-mentioned perpendicular to the entrance surface rays, pass through the parallel faces of the prism, and after refraction at the entrance and exit faces emerge parallel to their direction of incidence. These rays, having travelled a less distance than the twice reflected rays, will come to a focus beyond the true focus, and will cause halation on the sensitized surface. When the deflection exceeds the used entrance and exit faces, and the surplus area adjacent to the obtuse angle of the prism on both exit and emergent faces are rendered opaque then the oblique rays previously mentioned are cut off to an extent dependent on the width of the opaque surface.

Figures 1 and 2 are diagrammatic views illustrating the improved detailed construction for controlling the transmitted light;

Figure 3 indicates diagrammatically the area of the rectangular gate of the ordinary camera or projector with the indicated picture relation thereto;

Figure 4 is a more or less diagrammatic view of a particular rhomboidal prism used;

Figure 5 is a similar view of a slightly modified form of prism.

In the drawings a two picture arrangement is shown. The single lens unit L has lenses which may be considerably larger than the length of the pictures to be taken. The entrance surface of the prism $U^1$ is rectangular, having a width approximately the same as the picture and a length equal to the aperture of the back lens of the lens unit L. Figure 1 is a side elevation of the prism block. The light from the object emerges from the back lens of the lens unit L and passes into the rhomboidal prism $U^1$. Approximately one half is transmitted and one half is reflected by the partially silvered surface PS of the prism $U^1$. The reflected light undergoes a second reflection in prism $U^1$ as shown and then passes through the filter $F^1$, and parallel plate $U^4$ to form an image at $C^1$ on the sensitized surface of the film $P^1$, $P^2$.

The transmitted light passes through prisms $U^1$ and $U^2$ and the filter $F^2$ without reflection and enters the rhomboidal prism $U^3$. After being twice reflected in prism $U^3$, see Figure 2, it forms an image $C^2$ on the same sensitized surface $P^1$ and $P^2$, as the previously mentioned image $C^1$, provided that the optical length of the light paths through units $U^1$ and $U^4$ are exactly equal to the optical length of the light paths through units $U^1$, $U^2$, and $U^3$, plus the air space AS between the emergent faces of $U^3$ and $U^4$.

In the example indicated in the diagram units $U^1$ and $U^2$ have the same refractive index. This refractive index is higher than the refractive index of the glass of which unit $U^3$ is made.

The parallel plate $U^4$ can be made of any suitable refractive index to render the optical light paths equal, taking the air space AS into consideration. Figure 3 shows the area of the rectangular gate of the ordinary cinema camera or projector corresponding to the views shown in Figures 1 and 2. The lens unit L has its axis LA displaced with relation to the centre of the gate aperture. $C^1$ is the centre of the picture given by the reflected light through units $U^1$ and $U^4$ (Figure 1) and $C^2$ is the centre of the picture transmitted through units $U^1$, $U^2$ and $U^3$, the deflection of the picture $C^1$ is indicated in Figures 1, 2 and 3 by $S^1$, and that of the other picture by $S^2$.

Figure 4 shows a rhomboidal prism whose deflection $D^1$ equals the width EN, EX of the used entrance and exit faces measured in the direction of the deflection. The ray of light A falling perpendicular to the surface EN is twice reflected, and emerges from surface EX. The oblique ray B after refraction at surface EN passes through the prism without reflection and is again refracted at surface EX to emerge parallel to its direction of incidence and would produce halation of the sensitized surface.

In Figure 5 the rhomboidal prism is made longer so that $D^2$, the deflection, becomes greater than the width of the picture by the width of the opaque surface O, the clear width of EN and EX, the entrance and exit faces respectively, and the distance between them remaining the same as in Figure 4, then while the perpendicular ray A suffers two reflections as before, the oblique ray B after refraction at surface EN is stopped by the opaque portion of surface EX thus preventing halation.

It will therefore readily be seen that when pictures are taken through the composite prism unit as above described two pictures will be formed on the negative as shown in Figure 3 and furthermore these two pictures are arranged within a single monochromatic space. The negative will, if ordinary commercial film be used, be a monochromatic one. When the positive, taken from the negative, is to be projected the same is run through the projector at the ordinary speed and, as will be readily appreciated the two pictures will appear before the gate at the same time. A prism unit, either the same as or similar to the prism unit above described, is placed in front of the film whereupon the light passing through the picture $C^1$ will pass through the units $U^4$ and $U^1$ and the light from the picture $C^2$ will pass through the units $U^3$, $U^2$ and $U^1$ and the pictures emerging from the emergent face of the rhomboidal prism $U^1$ will be combined and can be projected on to a screen of any size with the usual sharpness of definition and an entire absence of parallax errors due to the fact that the pictures are taken through a single lens unit. Further as the film is run through the projector at the standard speed no extra strain is put on the projector mechanism.

A further very great advantage of this invention is that ordinary standard monochromatic film can be used in the ordinary way whereby the production of the colored pictures, according to this invention, is no more expensive than the production of ordinary monochromatic pictures.

I claim:—

1. Means for the reproduction in the same plane and in a single monochromatic space of two or more similar pictures, comprising a single lens unit, a composite prism unit through which the light is passed, said unit dividing the light into two beams, with each reflected twice before reaching the sensitized surface, the composite prism unit providing two images within a single monochromatic space on the sensitized surface, with the images in the same plane arranged diagonally of such space and free of line contact, said prism unit including a rhomboidal prism having its first reflecting surface formed to partially reflect and partially transmit the incident light, and a second rhomboidal prism for twice reflecting the transmitted light.

2. Means for the reproduction in the same plane and in a single monochromatic space of two or more similar pictures, comprising a single lens unit, a composite prism unit through which the light is passed, said unit dividing the light into two beams, with each reflected twice before reaching the sensitized surface, the composite prism unit providing two images within a single monochromatic space on the sensitized surface, with the images in the same plane arranged diagonally of such space and free of line contact, said prism unit including a rhomboidal prism having its first reflecting surface formed to partially reflect and partially transmit the incident light, a second rhomboidal prism for twice reflecting the transmitted light, and a parallel glass plate in the path of one of the beams.

In testimony whereof I have signed my name to this specification.

EDOUARD LUCIEN GROC.